UNITED STATES PATENT OFFICE.

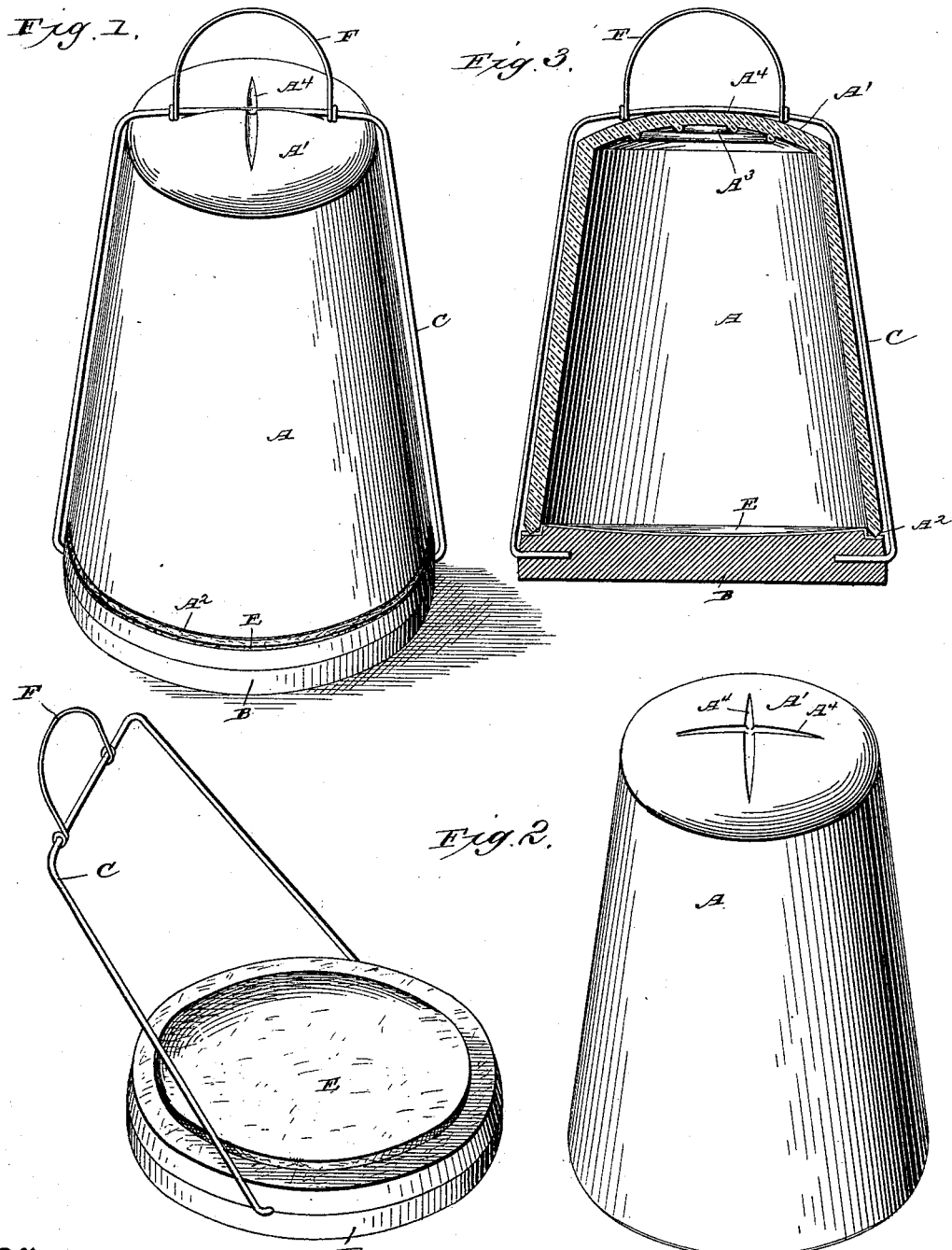

THOMAS B. HOWE, OF SCRANTON, PENNSYLVANIA, ASSIGNOR OF ONE-HALF TO LEWIS B. HALSEY, OF NEW YORK, N. Y.

BUTTER-JAR.

SPECIFICATION forming part of Letters Patent No. 423,928, dated March 25, 1890.

Application filed January 22, 1890. Serial No. 337,689. (No model.)

*To all whom it may concern:*

Be it known that I, THOMAS B. HOWE, of Scranton, in the county of Lackawanna and State of Pennsylvania, have invented certain new and useful Improvements in Jars for Butter and Lard, &c.; and I do hereby declare the following to be a full, clear, and exact description of the same, reference being had to the accompanying drawings, forming a part of this specification, and to the letters of reference marked thereon.

My invention has for its object, primarily, to provide a jar or receptacle in which butter, lard, or the like may be placed and tightly sealed, so as to enable the jar to be kept within a refrigerator without liability of the contents being affected.

In the accompanying drawings, Figure 1 represents a perspective view of my invention; Fig. 2, a similar view showing the parts separated; Fig. 3, a longitudinal vertical section.

Similar letters of reference in the several figures indicate the same parts.

A is the jar proper, of the general form of a frustum of a cone, but having a rounded top $A'$, which, among other things, operates to prevent the jar being stood up on said top and then used as a receptacle for holding materials not intended to be placed in it.

B is a base upon which the jar rests mouth downward, and C is a spring-wire bail pivoted to said base and adapted to inclose the jar and co-operate with its rounded top $A'$ to produce an air-tight joint between the jar and base, the tightness of which joint is insured by the interposition between the edge $A^2$ of the jar and the said base B of a suitable packing E, consisting of any suitable material—such, for instance, as paper. The body of the jar is preferably made of flint glass, and on the inside of its top is formed a molding-surface $A^3$ for the purpose of making an impression or print upon the butter or other material contained in the jar, though the body may be made of earthenware or of metal, if preferred. Not only is the top $A'$ of the jar rounded, as shown, so that it will co-operate with the swinging bail C to tightly bind the jar to the base B, but it is formed with depression $A^4$, in which the bail takes a seat to insure the permanency of the fastening.

The base B, I preferably make of wood, and the packing E, as before stated, is preferably of paper.

In order that the package thus formed may be conveniently transported from place to place, I provide the spring locking-bail C with a carrying-bail F. This carrying-bail not only serves as a handle in carrying, but as an aid in fastening and unfastening the spring locking-bail.

To remove the contents of the jar, it is only necessary to unlock the bail and remove the base, whereupon the contents can be slid out with ease, the tapering sides facilitating this operation.

My package is well adapted to holding butter or lard, as well as jellies, ice-cream, &c. For ice-cream it is especially well adapted, as the cream may be kept frozen in it for an indefinite time by placing it in a refrigerator or other cooling-chamber, and when the contents are to be removed the application of a light amount of heat exteriorly will enable the jar to be drawn off, leaving the cream intact in the form of a neat mold.

Having thus described my invention, what I claim as new is—

In the herein-described jar or receptacle for butter, &c., the combination, with the jar proper, having the closed and rounded top with the recesses therein, inclined sides, and open bottom or mouth, of the base for closing the said mouth, the spring-wire bail pivoted in said base and adapted to co-operate with the curved top and be retained by the recesses therein, whereby the base is held in place and sealed, and a handle-bail pivoted to the top of the locking-bail, substantially as described.

THOMAS B. HOWE.

Witnesses:
H. B. REYNOLDS,
C. D. ROCKWELL.